United States Patent Office 3,528,980
Patented Sept. 15, 1970

3,528,980
THIAZOLYL HYDANTOIN AND HYDROURACIL COMPOUNDS
Peter John Islip, Hampton, England, assignor to Parke, Davis & Company, Detroit, Mich., a corporation of Michigan
No Drawing. Filed Mar. 6, 1968, Ser. No. 710,748
Claims priority, application Great Britain, Mar. 23, 1967, 13,879/67
Int. Cl. C07d 91/34
U.S. Cl. 260—250.5                6 Claims

ABSTRACT OF THE DISCLOSURE 4-(5-nitro-2-furyl)thiazolyl hydantoins and hydrouracils (I and II):

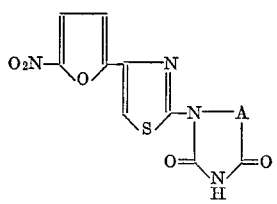

(I)

and

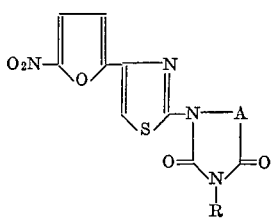

(II)

are provided; where A is alkylene and R is alkyl, allyl, propargyl, —CH$_2$COOH (or alkyl ester or salt), or

—CH$_2$CONH$_2$ (or N-alkyl or N,N-dialkyl derivative). The compounds having Formula I are prepared by cyclizing a haloacyl urea compound of Formula III:

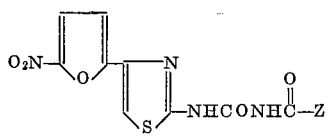

(III)

where Z is α- or β-haloalkyl. The compounds of Formula II are provided by reacting the compounds of Formula I with a compound of formula R—X where X is an acid-forming atom or group. The compounds (I and II) are pharmacological agents having antibacterial and tricho-monoacidal activity.

SUMMARY AND DETAILED DESCRIPTION

This invention relates to novel substituted heterocyclic compounds and to process means for producing the same. In particular, the invention relates to 4-(5-nitro-2-furyl)- thiazolyl hydantoins and hydrouracils having the formulas:

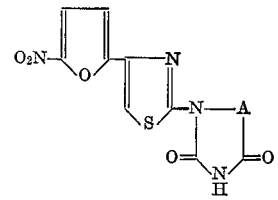

(I)

and

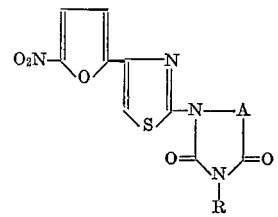

(II)

where A is an alkylene group having 1 to 3 carbon atoms, 1 or 2 of the carbon atoms being in the annular position of the heterocyclic ring; and R represents a lower alkyl, allyl or propargyl group, or a carboxymethyl group or a lower alkyl ester or salt thereof, or a carbamoylmethyl group or a N-lower alkyl or N,N-di(lower alkyl) derivative thereof. The term lower alkyl as used in the present specification refers to alkyl groups having from 1 to 3 carbon atoms.

In accordance with the invention, compounds having Formula I are produced by reacting a haloacyl urea compound of formula:

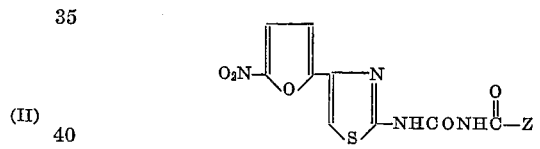

(III)

under cyclizing conditions in a non-reactive, non-hydroxylic solvent, where Z is an α-halo alkyl group or β-halo alkyl group having 1 to 3 carbon atoms. The reaction is carried out preferably in the presence of a base. As a solvent for the reaction one may use any of various solvents including ether (e.g., diethyl ether, tetrahydrofuran or dioxane), hydrocarbons (e.g., benzene or toluene), halogenated hydrocarbons (e.g., chloroform, ethylene dichloride or chlorobenzene), tertiary amides (e.g., dimethylformamide or N-methyl-2-pyrrolidone), or a mixture of any such solvents. The preferred solvent is dimethylformamide. Any of a number of inorganic and organic bases may be used for the reaction. For example, one may use an alkali metal carbonate such as sodium carbonate or potassium carbonate; an alkaline earth metal carbonate such as calcium carbonate; an alkaline metal earth oxide or hydroxide such as magnesium oxide or magnesium hydroxide; a Group Ib metal carbonate such as silver carbonate; an alkali metal or Group Ib metal lower alkanoate such as sodium acetate or silver propionate; or a tertiary amine such as pyridine, quinoline, triethylamine or N,N-dimethylaniline. An alkali metal hydride, especially sodium hydride, is the preferred base. The reaction time and temperature are not critical and for optimum results may be varied depending on the nature of the compound to be cyclized, and of the solvent and base employed. In general, the temperature should be sufficiently high to enable completion of the reaction within reasonable periods and yet on the other hand should not be excessive so that the reaction mixture undergoes undue thermal decomposition. In the case of a reaction employing sodium hydride as the base in dimethylformamide solvent, temperatures in the range of 0–150° C. for 10 minutes to 24 hours are ordinarily employed. Preferred conditions in this exemplary case are temperatures in the range from 20–100° C. for 30 minutes to 3 hours. The ratio of reactants is in general not critical. Ordinarily, equimolar quantities of the base and the acyl urea are employed, although an excess of base may be used if desired.

Also, in accordance with the invention, compounds having Formula II are produced by reacting compounds having Formula I with a compound having the formula R—X in the presence of base contained in a non-reactive, non-hydroxylic solvent, where X is an acid-forming atom or group and R has the same significance specified above. Suitable compounds for the reaction are the alkyl halides such as methyl iodide and propyl bromide; alkyl sulfates and sulfonates such as dimethyl sulfate and ethyl p-toluenesulfonate; allyl halides such as allyl bromide and allyl chloride; propargyl halides such as propargyl bromide and propargyl chloride; 2-halo acetamides such as 2-bromoacetamide and 2-bromo-N,N-dimethylacetamide; and haloacetic acids, salts and esters thereof such as chloroacetic acid, sodium chloroacetate and ethyl bromoacetate. Bases suitable for the reaction are the alkali metal hydroxides, alkoxides or hydrides. The preferred base is an alkali metal hydride, especially sodium hydride. Any of various solvents can be employed for the reaction including ethers (e.g., diethyl ether, dioxane or tetrahydrofuran), hydrocarbons (e.g., benzene or toluene), tertiary amides (e.g., dimethylformamide or N-methyl-2-pyrrolidone), dimethyl sulfoxide, and mixtures of any such solvents. Dimethylformamide is a preferred solvent for the reaction. The reaction time and temperature are not critical and may be varied widely. In general, temperatures in the range from 0 to 100° C. are suitable for periods from 15 minutes to 24 hours. Temperatures in the range from 20–60° C. for periods from 30 minutes to 6 hours are preferred. The ratio of the reactants may be varied considerably and is not critical. In general, however, equimolar quantities of the reactants are used or preferably a slight excess of base and a slight to moderate excess of the reactant R—X are employed. The reaction product can be isolated from the reaction mixture by any of a variety of conventional procedures. In the production of compounds having the formula in which R is a carboxymethyl group the product may be isolated as a free acid or as the corresponding salt by suitable adjustment of the pH.

The compounds of the invention possess valuable pharmacological properties. In particular, the compounds, like the known agent furazolidone, are amebacidal at low concentration (i.e., about 25 gamma per ml. or lower) against *T. vaginalis* by standard assay (described in Trussell's *Trichomonas vaginalis* and Trichomoniasis, page 54 and elsewhere, Thomas, Springfield, Illinois, 1947, and in Antibiotics and Chemotherapy, 9, 611). The compounds of the invention also have antibacterial activity. They are cidal when tested (Biochemical Pharmacology, 3, 10) against various organisms such as *S. aureus, E. coli, S. pyrogenes* and *S. sonnei* at low concentration, that is, about 20 gamma per ml. and lower. Hence, the compounds can be used as trichomonacidal agents and antibacterial agents. For these purposes, the compounds in conventional formulation can be used topically or by the oral or parenteral routes. The compounds can also be used at cidal or suppressive concentration as a germicidal or disinfectant ingredient in conventional formulation for preventing or arresting the growth or action of microorganisms, for janitorial use, and for sanitizing articles of apparel, living quarters and the like. The compounds are also useful as intermediates for the production of similar products having antibacterial and trichomonacidal activity.

For the purpose of the invention, preferred products are:

1-[4-(5-nitro-2-furyl)-2-thiazolyl]hydrouracil
3-[4-(5-nitro-2-furyl)-2-thiazolyl]-2,5-dioxo-1-imidazolidineacetic acid, ethyl ester
N,N-dimethyl-3-[4-(5-nitro-2-furyl)-2-thiazolyl]-2,5-dioxo-1-imidazolidineacetamide
3-ethyl-1-[4-(5-nitro-2-furyl)-2-thiazolyl]hydrouracil
1-[4-(5-nitro-2-furyl)-2-thiazolyl]hydantoin The acyl urea starting materials for the invention are novel substances and are prepared by reacting 2-amino-4-(5-nitro-2-furyl)thiazole with the appropriate α-halo or β-halo acyl isocyanate in equimolar quantity in a non-reactive solvent such as tetrahydrofuran for about 3 hours. The acyl isocyanates in turn may be prepared by the reaction of the appropriate primary amide with oxalyl chloride in ethylene dichloride for 16 hours at reflux temperature in accordance with the method described in J. Org. Chem. 28:1805 (1963).

The invention is illustrated by the following examples:

Example 1

A dispersion of sodium hydride (2.77 g., 50% in mineral oil) is added portionwise to an ice-cooled stirred solution of 1 - (bromoacetyl) - 3 - [4 - (5 - nitro - 2 - furyl)-2-thiazolyl] urea (19.1 g.) in dimethylformamide (50 ml.). The mixture is stirred for 10 minutes at 20–25° C. and at 40° C. for 45 minutes and is then diluted wtih water (1 liter). The desired product which precipitates, 1 - [4 - (5 - nitro - 2 - furyl) - 2 - thiazolyl]hydantoin, is isolated by filtration and is washed in sequence with water, ethanol and ether; M.P. 278–280° C., after recrystallization from acetic acid.

In the same procedure where the urea compound is replaced by 1 - (chloroacetyl) - 3 - [4 - (5 - nitro - 2 - furyl)-2-thiazolyl]urea, the same product is obtained.

The acyl urea starting material for the reaction is prepared as follows: a solution of bromoacetyl isocyanate (5.1 g.) in tetrahydrofuran (10 ml.) is added dropwise to a stirred solution of 2-amino-4-(5-nitro-2-furyl)thiazole stirred for one-half hour at 20–25° C. and the product which separates is collected. This product, 1-(bromo-(5.14 g.) in tetrahydrofuran (100 ml.). The mixture is acetyl) - 3 - [4 - (5 - nitro - 2 - furyl) - 2 - thiazolyl]urea, is purified by recrystallization from dimethylformamide and washed with hot water; M.P. 213° C. (dec.).

Example 2

A 50% dispersion of sodium hydride (2.77 g.) in mineral oil is added portionwise to an ice-cooled stirred solution of 1-(2-bromobutyryl)-3-[4-(5-nitro-2-furyl)-2-thiazolyl]urea (23.3 g.) in dimethylformamide (50 ml.). The mixture is stirred for 3 hours at 20–25° C. and is then diluted with 1 liter of water. The desired product, 5 - ethyl-1-[4-(5-nitro-2-furyl)-2-thiazolyl]hydantoin, separates and is collected; M.P. 238–239° C., after recrystallization from acetic acid.

By the same procedure but replacing the urea starting material with 1 - (2 - bromopropionyl)-3-[4-(5-nitro-2-furyl)-2-thiazolyl]urea (22.4 g.) one obtains as the product 5 - methyl-1-[4-(5-nitro - 2 - furyl)-2-thiazolyl]hydantoin.

The acyl urea starting material for the above procedure can be prepared as follows: a solution of 2-bromobutyryl isocyanate (5.8 g.) in tetrahydrofuran (10 ml.) is added dropwise to a stirred solution of 2-amino-4-(5-nitro-2-furyl)thiazole (5.14 g.) in tetrahydrofuran (100 ml.). The mixture is stirred for 2 hours at 40° C. and the desired product which precipitates, 1-(2-bromobutyryl)-3-[4-(5-nitro-2-furyl)-2-thiazolyl]urea, is collected by filtration; M.P., after recrystallization from acetic acid, 227° C. (with decomposition).

Example 3

A 50% dispersion of sodium hydride (2.77 g.) in mineral oil is added in portions to an ice-cooled stirred solution of 1 - (2-bromo-2-methylpropionyl)-3-[4-(5-nitro-2- furyl)-2-thiazolyl]urea (21.0 g.) and the reaction mixture is stirred for 3 hours at 100° C. The desired product which separates is collected. This product, 5,5-dimethyl-1-[4-(5-nitro-2-furyl)-2-thiazolyl]hydantoin is recrystallized from dimethylformamide and the crystals are washed with hot water; M.P. 295–296° C. (dec.).

The acyl urea starting material for the reaction is prepared as follows: a solution of 2-bromo-2-methylpropionyl isocyanate (5.8 g.) in tetrahydrofuran (10 ml.) is added dropwise to a stirred solution of 2-amino-4-(5-nitro-2-furyl)thiazole (5.14 g.) in tetrahydrofuran (100 ml.). The mixture is stirred for one hour at 20–25° C. and the desired product which separates, 1-(2-bromo-2-methylpropionyl)-3-[4-(5-nitro - 2 - furyl)-2-thiazolyl] urea, is collected; M.P. 249–251° C. (dec.), after recrystallization from acetic acid.

Example 4

A 50% dispersion of sodium hydride (2.77 g.) in mineral oil is added portionwise to an ice-cooled stirred solution of 1 - (3-bromopropionyl)-3-[4-(5-nitro-2-furyl)-2-thiazolyl]urea (22.4 g.) in 50 ml. of dimethylformamide. The resulting mixture is stirred for one-half hour at 20–25° C. The desired product, 1-[4-(5-nitro-2-furyl)-2-thiazolyl]hydrouracil, separates and is collected; M.P. 298° C. (with dec., after recrystallization from acetic acid).

The acyl urea starting material for the reaction can be prepared as follows: a solution of 3-bromopropionyl isocyanate (5.5 g.) in tetrahydrofuran (10 ml.) is added dropwise to a stirred solution of 2-amino-4-(5-nitro-2-furyl)thiazole (5.14 g.) in tetrahydrofuran (100 ml.). The reaction mixture is stirred for 1½ hours at 20–25° C. and the desired product 1-(3-bromopropionyl)-3-[4-(5-nitro-2-furyl)-2-thiazolyl]urea, is collected and recrystallized from dimethylformamide; M.P. 228° C. (dec.).

Example 5

A 50% dispersion of sodium hydride (0.96 g.) in mineral oil is added to a solution of 1-[4-(5-nitro-2-furyl)-2-thiazolyl]hydantoin in 30 ml. of dimethylformamide. The mixture is stirred and 2.76 g. of 2-bromoacetamide is added. The mixture is stirred for 4 hours at 40° C. and is then diluted with water. The desired product separates and is collected. This product, 3-[4-(5-nitro-2-furyl)-2-thiazolyl]-2,5-dioxo - 1 - imidazolidineacetamide, melts at 291–293° C. after recrystallization from dimethylformamide.

By the same procedure but substituting a different reactant as follows for 2-bromoacetamide, one obtains the following products:

EXAMPLE 6

A 50% dispersion of sodium hydride (1.48 g.) in mineral oil is added to an ice-cooled suspension of 1[4-(5-nitro-2-furyl)-2-thiazolyl]hydrouracil (9.45 g.) in 100 ml. of dimethylformamide. The resulting mixture is stirred and 8.7 g. of methyl iodide is added. The mixture is stirred further for one hour at 40° C. and is then poured into water and the resulting solid product collected by filtration. This product is 3-methyl-1-[4-(5-nitro-2-furyl)-2-thiazolyl]hydrouracil; M.P. 276–277° C. (dec., after recrystallization from acetic acid).

By the same procedure but replacing methyl iodide by ethyl iodide (5.0 g.) and stirring the reaction mixture for one hour at 35° C., the product obtained is 3-ethyl-1-[4-(5-nitro-2-furyl) - 2 - thiazolyl]hydrouracil; M.P. 238–240° C. (dec., after recrystallization from acetic acid).

Also by the same procedure but replacing the methyl iodide with propyl bromide (6.6 g.) and stirring the reaction mixture for 4 hours at 40° C., the product obtained is 1-[4-(5-nitro-2-furyl)-2-thiazolyl]-3-propylhydrouracil; M.P. 210–212° C., after recrystallization from acetic acid.

Further by the same procedure but replacing methyl iodide by sodium chloroacetate (4.0 g.) and by stirring the mixture for 4 hours, then diluting with water and acidifying with hydrochloric acid, one obtains the product hexahydro - 3 - [4 - (5-nitro-2-furyl)-2-thiazolyl]-2,6-dioxo-1-pyrimidine acetic acid, as a precipitate. The product is collected by filtration and is purified by recrystallization from acetic acid. The same product is obtained using chloroacetic acid (2.9 g.) and 2.96 g. of sodium hydride. The corresponding sodium salt is obtained by dissolving 3.66 g. of the acid in 50 ml. of 0.2 N aqueous sodium hydroxide and lyophilizing the resulting solution. The corresponding potassium salt is prepared by dissolving 3.66 g. of the acid in 50 ml. of 0.2 N aqueous potassium hydroxide and evaporating the resulting solution to dryness at reduced pressure.

I claim:

1. 4-(nitrofuryl)thiazolyl hydantoins and hydrouracils having the formulas:

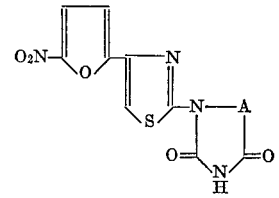

(I)

| Reactant (amount) | Reaction time (hours) at 40° C. | Product | Melting point of product,[1] ° C. |
|---|---|---|---|
| Ethyl bromoacetate (3.8 g.) | 4 | 3-[4-(5-nitro-2-furyl)-2-thiazolyl]-2,5-dioxo-1-imidazolidineacetic acid, ethyl ester. | 176–178 |
| 2-bromo-N,N-diethylacetamide (3.9 g.). | 5 | N,N-diethyl-3-[4-(5-nitro-2-furyl)-2-thiazolyl]-2,5-dioxo-1-imidazolidineacetamide. | [2] 237–239 |
| 2-bromo-N,N-dimethyl-acetamide (3.66 g.). | 4 | N,N-dimethyl-3-[4-(5-nitro-2-furyl)-2-thiazolyl]2,5-dioxo-1-imidazolidineacetamide. | [2] 261–263 |
| Ethyl bromide (4.4 g.) | 3 | 3-ethyl-1-[4-(5-nitro-2-furyl)-2-thiazolyl]-2-thiazolyl]hydantoin. | 236–239 |
| Methyl iodide (3.6 g.) | 1 | 3-methyl-1-[4-5-nitro-2-furyl)-2-thiazolyl]hydantoin. | 234–236 |
| Allyl bromide (2.5 g.) | 4 | 3-allyl-1-[4-(5-nitro-2-furyl)-2-thiazolyl]hydantoin. | [3] 161–163 |
| Propargyl bromide (2.4 g.) | 4 | 1-[4-(5-nitro-2-furyl)-2-thiazolyl]-3-propargylhydantoin. | [4] 219–221 |

[1] Recrystallized from acetic acid except where otherwise specified.
[2] Dec.
[3] Dimethylformamide; hot water wash.
[4] Aq. dimethylformamide; warm water wash.

and

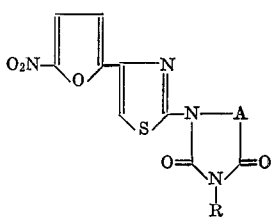

(II)

where A is an alkylene group having 1 to 3 carbon atoms, 1 or 2 of the carbon atoms being in the annular position of the heterocyclic ring; and R represents a lower alkyl, allyl or propargyl group, or a carboxymethyl group or a lower alkyl ester or a sodium or potassium salt thereof, or a carbamoylmethyl group or a N-(lower alkyl) or N,N-di(lower alkyl) derivative thereof.

2. A compound according to Formula I of claim 1 where A is —CH$_2$CH$_2$— which compound is 1-[4-(5-nitro-2-furyl)-2-thiazolyl]hydrouracil.

3. A compound according to Formula II of claim 1 where A is —CH$_2$— and R is —CH$_2$COOC$_2$H$_5$ which compound is 3 - [4 - (5 - nitro-2-furyl)-2-thiazolyl]-2,5-dioxo-1-imidazolidineacetic acid, ethyl ester.

4. A compound according to Formula II of claim 1 where A is —CH$_2$— and R is —CH$_2$CONH$_2$ which compound is N,N-dimethyl - 3 - [4-(5-nitro-2-furyl)-2-thiazolyl]-2,5-dioxo-1-imidazolidineacetamide.

5. A compound according to Formula II of claim 1 where R is —CH$_2$CH$_2$— and R is ethyl which compound is 3-ethyl-1-[4-(5-nitro-2-furyl)-2-thiazolyl]hydrouracil.

6. A compound according to Formula I of claim 1 where A is —CH$_2$— which compound is 1-[4-(5-nitro-2-furyl)-2-thiazolyl]hydantoin.

References Cited
UNITED STATES PATENTS

| | | | |
|---|---|---|---|
| 3,055,910 | 9/1962 | Dickson et al. | 260—306.8 |
| 3,149,119 | 9/1964 | Ebetino | 260—306.8 |
| 3,297,699 | 1/1967 | Schmidt et al. | 260—256.5 |

ALEX MAZEL, Primary Examiner

R. J. GALLAGHER, Assistant Examiner

U.S. Cl. X.R.

260—306.8; 424—251, 270